US011343579B2

(12) United States Patent
Tan et al.

(10) Patent No.: US 11,343,579 B2
(45) Date of Patent: May 24, 2022

(54) INTELLIGENT BUFFERING METHOD, DEVICE AND STORAGE MEDIUM OF A WEB VIDEO BASED ON A BROWSER

(71) Applicant: SHANGHAI BILIBILI TECHNOLOGY CO., LTD., Shanghai (CN)

(72) Inventors: Zhaoxin Tan, Shanghai (CN); Jianqiang Ding, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/423,655

(22) PCT Filed: Dec. 16, 2019

(86) PCT No.: PCT/CN2019/125526

§ 371 (c)(1), (2) Date: Jul. 16, 2021

(87) PCT Pub. No.: WO2020/151401

PCT Pub. Date: Jul. 30, 2020

(65) Prior Publication Data

US 2022/0078519 A1 Mar. 10, 2022

(30) Foreign Application Priority Data

Jan. 23, 2019 (CN) ......................... 201910061648.2

(51) Int. Cl.
*H04N 21/4782* (2011.01)
*H04N 21/4363* (2011.01)
(Continued)

(52) U.S. Cl.
CPC ....... *H04N 21/4782* (2013.01); *H04N 21/433* (2013.01); *H04N 21/4363* (2013.01); *H04N 21/44004* (2013.01)

(58) Field of Classification Search
None
See application file for complete search history.

(56) References Cited

U.S. PATENT DOCUMENTS 6,510,458 B1 1/2003 Berstis et al.
9,654,528 B1 * 5/2017 Cho ................ H04N 21/23406
(Continued)

FOREIGN PATENT DOCUMENTS

CN 101001362 A 7/2007
CN 102868908 A 1/2013
(Continued)

OTHER PUBLICATIONS

International Patent Application No. PCT/CN2019/125526; Int'l Search Report; dated Mar. 19, 2020; 3 pages.

*Primary Examiner* — Junior O Mendoza
(74) *Attorney, Agent, or Firm* — BakerHostetler

(57) ABSTRACT

The present invention provides a method, device and computer-readable storage medium of intelligently buffering a Web video based on a browser, and belongs to a field of the Internet technology. The method, device and computer-readable storage medium of intelligently buffering a Web video based on a browser comprises a browser calculating an available buffer duration based on an available memory size of a buffer and a bit rate; initializing a player based on the available buffer duration; buffering and playing the video to be played using the player. So, the buffer duration can be set flexibly based on different browser platforms and an average bit rate of the video, which can maximize the use of a cache space, and effectively avoid the occurrence of
(Continued)

1 a browser obtaining a bit rate of a video to be played 2 the browser calculating an available buffer duration according to an available memory size of a buffer and the bit rate 3 the browser initializing a player according to the available buffer duration 4 the browser buffering and playing the video with the player

5 sticking during video playback, and make better use of the bandwidth, so as to greatly improve the user experience.

12 Claims, 4 Drawing Sheets

(51) Int. Cl.
*H04N 21/44* (2011.01)
*H04N 21/433* (2011.01)

(56) References Cited

U.S. PATENT DOCUMENTS

| | | | | |
|---|---|---|---|---|
| 2002/0165970 | A1* | 11/2002 | Ludewig | H04L 29/06027 709/228 |
| 2015/0208120 | A1* | 7/2015 | Yao | H04N 21/6543 725/9 |
| 2018/0241796 | A1* | 8/2018 | Srinivasan | H04L 65/4084 |
| 2019/0334803 | A1* | 10/2019 | Ickin | H04L 65/4092 |
| 2020/0099979 | A1* | 3/2020 | Panchaksharaiah | H04N 21/4532 |

FOREIGN PATENT DOCUMENTS

| | | | |
|---|---|---|---|
| CN | 102917028 | A | 2/2013 |
| CN | 103841456 | A | 6/2014 |
| CN | 107197363 | A | 9/2017 |
| CN | 107222776 | A | 9/2017 |
| CN | 107333169 | A | 11/2017 |
| CN | 108337554 | A | 7/2018 |
| CN | 108810656 | A | 11/2018 |
| EP | 2278803 | A2 | 1/2011 |
| WO | WO 2018/132975 | A1 | 7/2018 |

* cited by examiner

5

5

INTELLIGENT BUFFERING METHOD, DEVICE AND STORAGE MEDIUM OF A WEB VIDEO BASED ON A BROWSER

CROSS-REFERENCE TO RELATED APPLICATION

The present invention is a national phase application of PCT international patent application No. PCT/CN2019/125526, filed on Dec. 16, 2019, which claims priority to Chinese patent application No. 201910061648.2, filed on Jan. 23, 2019. The entire disclosure of the above-identified application is hereby incorporated by reference herein and made a part of this specification.

TECHNICAL FIELD

The embodiments of the present application relate to a field of the Internet technology, more particularly to relate to a field of network video technology, and specifically to refer to an intelligent buffering method, a device and a computer-readable storage medium of a web video based on a browser.

BACKGROUND

Video website is a popular content website at present. Web browser is one of the main ways to visit video websites. When a video is played by a Web, buffer time of the video is limited by a browser, and strategies of different browsers are different, therefore, the general approach is to take an Edge to prevent browser limits from being triggered (for example, 3 minutes).

However, one of the problems is that buffer time of the video is very limited, when a user wants to fast forward to a certain location of the video or look back or loop play, buffer area may be exceeded, and the video needs to be gotten again, which greatly increases loads of the browser and the network. On the other hand, different browser platforms provide different cache intervals and bit rates of the video played are also different. Therefore, a potential available cache space is often larger than the Edge.

Therefore, how to limit the buffer time flexibly according to the browser platforms and average bit rate of the video, avoid sticking and make better use of bandwidth has become an urgent problem in the field.

SUMMARY

The purpose of the present invention is to overcome above disadvantages of the prior art, and provide an intelligent buffering method, device and computer-readable storage medium of a Web video based on a browser, which can limit the buffer time flexibly, avoid stucking and make better use of bandwidth according to different settings of the browser platforms and average bit rate of the video, so as to enhance the user experience.

In order to realize the above purpose, the intelligent buffering method of a Web video based on a browser in this present invention comprises the following steps:

(1) a browser obtaining a bit rate of a video to be played:

(2) the browser calculating an available buffer duration according to an available memory size of a buffer and the bit rate;

(3) the browser initializing a player according to the available buffer duration;

(4) the browser buffering and playing the video with the player.

In the intelligent buffering method of a Web video based on a browser, the step (2) specifically comprising the following steps:

the browser calculating the available buffer duration TO according to the following formula.

$$TO=(Y/X\times 8)/P$$

Wherein, Y stands for the available memory size of the buffer; X stands for the bit rate; P stands for a video float ratio.

In the intelligent buffering method of a Web video based on a browser, the step (3) specifically comprising the following steps:

(31) the browser determining whether a default maximum buffer duration TN is greater than the available buffer duration TO, if yes, step (32) is executed, if no, step (33) is executed;

(32) the browser initializing the player with the available buffer duration as a buffer length of the browser, and the step (4) is executed;

(33) the browser initializing the player with the default maximum buffer duration as the buffer length of the browser, and the step (4) is executed.

In the intelligent buffering method of a Web video based on a browser, the step (4) specifically comprising the following steps:

the browser buffering and playing the video with the player, buffering in real time during playback, and making video contents in the buffer include a part of the video before current playing position and a part of the video after the current playing position.

In the intelligent buffering method of a Web video based on a browser, wherein a ratio between the part of the video before the current playing position and the part of the video after the current playing position is 1:2

The present invention further provides an intelligent buffering method of a Web video based on a browser, comprising the following steps:

(A) a client running a browser, wherein the browser obtains a bit rate of a video to be played from a server;

(B) the browser calculating an available buffer duration according to an available memory size of a buffer corresponding to the browser and the bit rate:

(C) the browser initializing a player according to the available buffer duration;

(D) the browser obtaining the video from the server, buffering and playing the video with the player.

In the intelligent buffering method of a Web video based on a browser, the step (B) specifically comprising the following steps:

the browser calculating the available buffer duration TO according to the following formula, $$TO=(Y/X\times 8)/P$$

Wherein, Y stands for the available memory size of the buffer; X stands for the bit rate; P stands for a video float ratio.

In the intelligent buffering method of a Web video based on a browser, the step (C) specifically comprising the following steps:

(C1) the browser determining whether a default maximum buffer duration TN is greater than the available buffer duration TO, if yes, step (C2) is executed, if no, step (C3) is executed;

(C2) the browser initializing the player with the available buffer duration as a buffer length of the browser, and the step (D) is executed;

(C3) the browser initializing the player with the default maximum buffer duration as the buffer length of the browser, and the step (D) is executed.

This present invention further provides a computer-readable storage medium, storing computer programs executed by a processor, when the computer programs are executed by a processor, the intelligent buffering method of a Web video based on a browser is realized.

This present invention further provides an intelligent buffering device of web video based on browsers, which comprises a processor and a memory, wherein the memory stores computer programs, when the computer programs are executed by the processor, the intelligent buffering method of a Web video based on a browser is realized.

The intelligent buffering method, device and computer-readable storage medium of a Web video based on a browser are adopted, a browser calculates an available buffer duration according to an available memory size of a buffer and a bit rate; initializes a player according to the available buffer duration; and buffers and plays the video to be played with the player. So, the buffer duration can be set flexibly based on different browser platforms and an average bit rate of the video, which can maximize the use of a cache space, and effectively avoid the occurrence of stucking during video playback, and make better use of the bandwidth, so as to greatly improve the user experience. And, the intelligent buffering method, device and computer-readable storage medium of a Web video based on a browser of the present invention have the advantages of simple implementation mode, low application cost and wide application range.

DETAILED DESCRIPTION OF ILLUSTRATIVE EMBODIMENTS

In order to be able to understand the technical content of the present invention more clearly, the following embodiments are particularly described.

Figure 1:
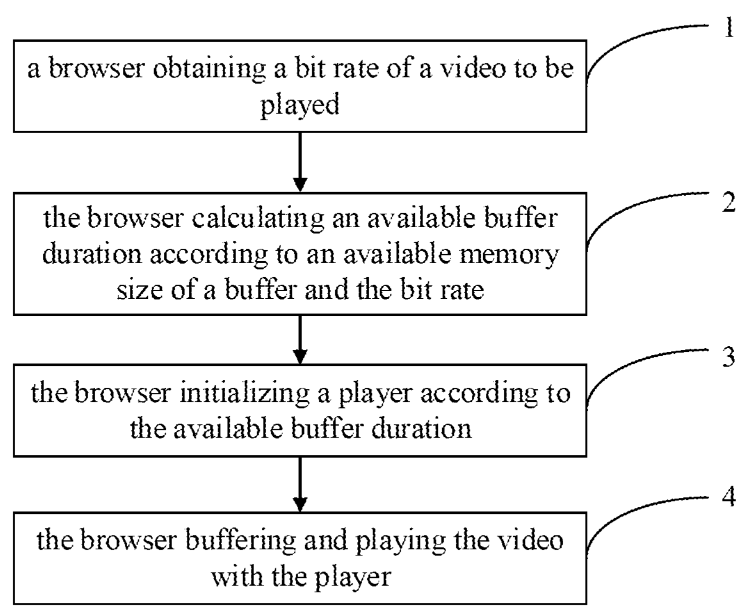
FIG. 1 illustrates a flowchart of steps of an embodiment of an intelligent buffering method of a Web video based on a browser of the present invention.

Please refer to FIG. 1, it is a flowchart of steps of an embodiment of an intelligent buffering method of a Web video based on a browser of the present invention.

In one embodiment, the intelligent buffering method of a Web video based on a browser includes the following steps:

(1) a browser obtaining a bit rate of a video to be played;

(2) the browser calculating an available buffer duration according to an available memory size of a buffer and the bit rate;

(3) the browser initializing a player according to the available buffer duration;

(4) the browser buffering and playing the video with the player.

In one preferred embodiment, the step (2) specifically includes the following steps:

the browser calculating the available buffer duration TO according to the following formula, $$TO=(Y/X\times 8)/P$$

Wherein, Y stands for the available memory size of the buffer; X stands for the bit rate; P stands for a video float ratio.

In another preferred embodiment, the step (3) specifically includes the following steps:

(31) the browser determining whether a default maximum buffer duration TN is greater than the available buffer duration TO, if yes, step (32) is executed, if no, step (33) is executed;

(32) the browser initializing the player with the available buffer duration as a buffer length of the browser, and the step (4) is executed;

(33) the browser initializing the player with the default maximum buffer duration as the buffer length of the browser, and the step (4) is executed.

In a more preferred embodiment, the step (4) specifically includes the following steps: the browser buffering and playing the video with the player, buffering in real time during playback, and making video contents in the buffer include a part of the video before a current playing position and a part of the video after the current playing position. A ratio between the part of the video before the current playing position and the part of the video after the current playing position can be 1:2.

Figure 2:
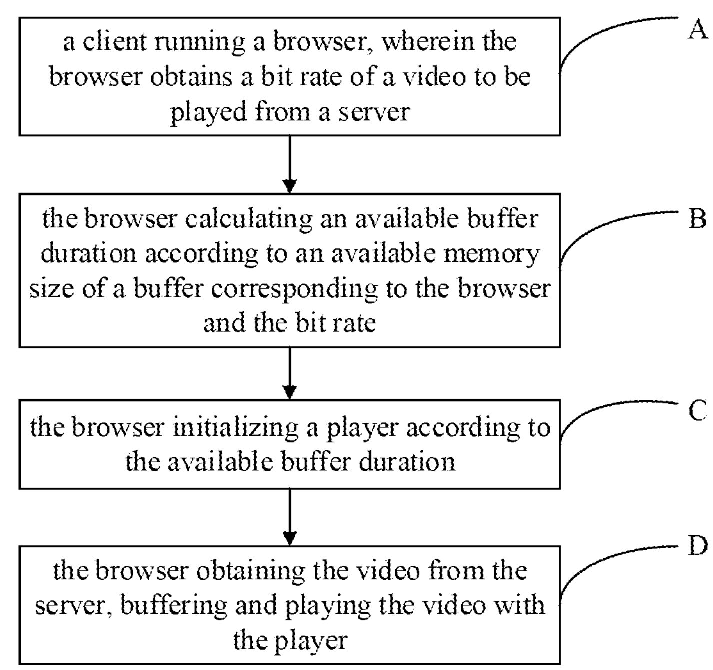
FIG. 2 illustrates a flowchart of steps of another embodiment of the intelligent buffering method of a Web video based on a browser of the present invention.

The present invention also provides an intelligent buffering method of a Web video based on a browser, in another embodiment, as shown in FIG. 2, the embodiment includes the following steps:

(A) a client running a browser, wherein the browser obtains a bit rate of a video to be played from a server, (B) the browser calculating an available buffer duration according to an available memory size of a buffer corresponding to the browser and the bit rate;

(C) the browser initializing a player according to the available buffer duration;

(D) the browser obtaining the video from the server, buffering and playing the video with the player.

In one preferred embodiment, the step (B) specifically includes the following steps:

the browser calculating the available buffer duration TO according to the following formula.

$$TO=(Y/X\times 8)/P$$

Wherein, Y stands for the available memory size of the buffer, X stands for the bit rate; P stands for a video float ratio.

In a more preferred embodiment, the step (C) specifically includes the following steps:

(C1) the browser determining whether a default maximum buffer duration TN is greater than the available buffer duration TO, if yes, step (C2) is executed, if no, step (C3) is executed;

(C2) the browser initializing the player with the available buffer duration as a buffer length of the browser, and the step (D) is executed;

(C3) the browser initializing the player with the default maximum buffer duration as the buffer length of the browser, and the step (D) is executed.

The present invention also provides an intelligent buffering method of a Web video based on a browser and a computer-readable storage medium, the device includes a processor and a memory. The memory is the computer-readable storage medium, storing computer programs. When the computer programs are executed by the processor, the intelligent buffering method of a Web video based on a browser is realized.

Figure 3:
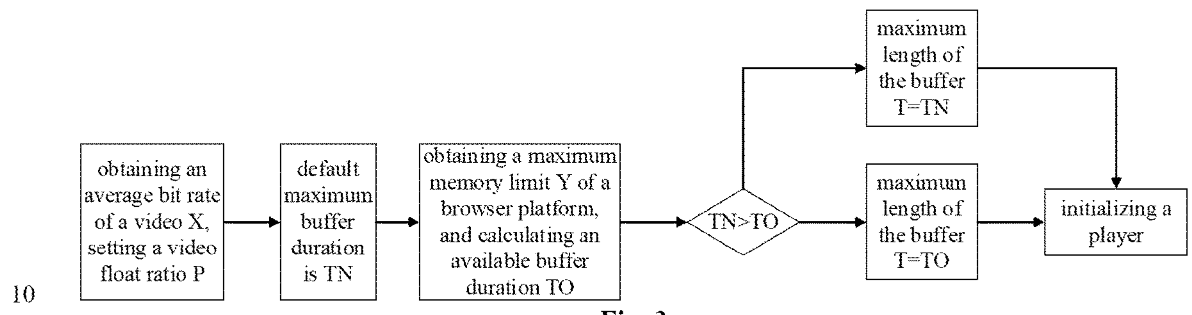
FIG. 3 illustrates a flowchart of the intelligent buffering method of a Web video based on a browser of the present invention in a practical application.

In an actual application, a flowchart of the intelligent buffering method of a Web video based on a browser of the present invention is shown in FIG. 3, specific implementation mode are described by the following embodiments.

Embodiment 1

A Web is limited by a browser during video playback, and strategies of different browsers are different, the general approach is to take an Edge to prevent browser limits from being triggered (for example, 3 minutes), a buffer limit of each browser is shown in Table 1:

TABLE 1 buffer limits of main browsers

| | Chrome | Firefox | Safari | Edge |
|---|---|---|---|---|
| Video | 150 MB | 100 MB | 290 MB | 3 min |
| Audio | 12 MB | 15 MB | 14 MB | 3 min |

In order to make the best use of the maximum memory limits of different browsers and realize a longer buffer duration, the intelligent buffering method of the present invention is shown in FIG. 3, which roughly includes the following steps:

1. obtaining an average bit rate of a video X, setting a video float ratio P, a default maximum buffer duration is TN;
2. obtaining a maximum memory limit Y of a browser platform, and calculating an available buffer duration TO according to the bit rate $$TO(s)=(Y/X\times8)/P(\text{Edge}=180)$$

3. during a player initialization, selecting the smaller buffer duration from the default maximum buffer duration TN and the available buffer duration TO to initialize maximum length of the buffer of the player T=Math.min (TN, TO);
4. after that, buffering and playing the video.

Taking a video with a video bit rate of 4 Mbps and an audio frequency of 128 kbps as an example, an original fixed cache duration is 3 minutes, after using the above intelligent buffering method of a Web video based on a browser of the present invention, the cache duration can be 5 minutes on the Chrome browser and nearly 10 minutes on the Safari browser.

Figure 4:
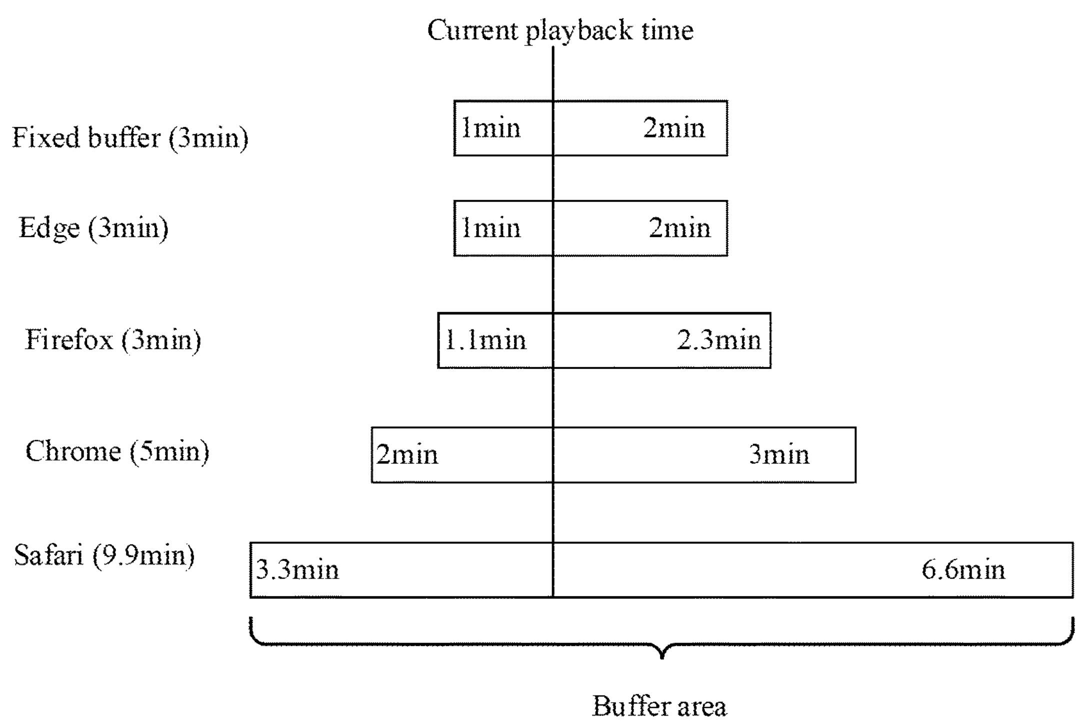
FIG. 4 illustrates a schematic diagram of the buffer duration of each main browser after using the intelligent buffering method of a Web video based on a browser of the present invention.

The buffer duration of each main browser after adopting the intelligent buffering method of a Web video based on a browser of the present invention is shown in FIG. 4.

Embodiment 2

For a total buffer duration, generally, the content that has been played also be cached for a period of time, taking a ratio of 1:2 between the content that has been played and the content that has not been played as an example.

In a scene that seeks backward for a progress. When seeking the progress, the original 3-minute length can support seeking backward and looking back for 1-minute content without re-pulling video data, if the length exceeds 1 minute, the buffer needs to be re-allocated, and resulting in re-obtaining the video data. After the intelligent algorithm is used, chrome browser can seek 2-minute length backward, which can save at least 1-minute buffer stream data.

In a loop playback scene, if for a looped video, if the looped video is less than 3 minutes, the buffer area can completely contain the video data, and there is no need to get the video again, if the looped video is more than 3 minutes, the video data needs to be obtained continuously or saved the video data in a non-play memory, which increases a difficulty of an implementation and a bandwidth consumption. If the intelligent buffering method of the present invention is adopted, the video with the video bit rate of 4 Mbps and the audio frequency of 128 kbps looped in chrome only needs to obtain the video data once within 5 minutes, which greatly saves the bandwidth and the implementation cost.

In addition, the intelligent buffering method of the present invention can also support a flexible implementation of some strategies, such as dynamically increasing buffer, etc., and has a wide application range.

The intelligent buffering method, device and computer-readable storage medium of a Web video based on a browser are adopted, a browser calculates an available buffer duration according to an available memory size of a buffer and a bit rate; initializes a player according to the available buffer duration; and buffers and plays the video to be played with the player. So, the buffer duration can be set flexibly based on different browser platforms and an average bit rate of the video, which can maximize the use of a cache space, and effectively avoid the occurrence of stucking during video playback, and make better use of the bandwidth, so as to greatly improve the user experience. And, the intelligent buffering method, device and computer-readable storage medium of a Web video based on a browser of the present invention have the advantages of simple implementation mode, low application cost and wide application range.

In this specification, the present invention has been described with reference to its specific embodiments. However, it is clear that various modifications and changes can still be made without departing from the spirit and scope of the present invention. Therefore, the specification and drawings shall be considered as illustrative rather than restrictive.

What is claimed is:

1. A method of intelligently buffering a Web video based on a browser, comprising:

obtaining, by a browser, a bit rate of a video to be played;

determining, by the browser, an available buffer duration based on an available memory size of a buffer and the bit rate;

initializing, by a browser, a player based on the available buffer duration;

buffering and playing the video using the player; and wherein the determining, by the browser, an available buffer duration based on an available memory size of a buffer and the bit rate further comprises:

determining the available buffer duration based on a formula: TO=(Y/X×8)/P, wherein TO represents the available buffer duration, Y represents the available memory size of the buffer, X represents the bit rate, and P represents a predetermined video float ratio.

2. The method of claim 1, wherein the initializing, by the browser, a player based on the available buffer duration further comprises:

determining whether a default maximum buffer duration TN is greater than the available buffer duration TO;

initializing the player based on the available buffer duration as a buffer length of the browser in response to determining that the default maximum buffer duration TN is greater than the available buffer duration TO; and initializing the player based on the default maximum buffer duration as the buffer length of the browser in response to determining that the default maximum buffer duration TN is not greater than the available buffer duration TO.

3. The method of claim 1, wherein the buffering and playing the video using the player further comprises:

buffering in real time during a playback, wherein content of the video in the buffer comprises a part of the video prior to a current playing position and a part of the video after the current playing position.

4. The method of claim 3, wherein a ratio between the part of the video prior to the current playing position and the part of the video after the current playing position is 1:2.

5. A non-transitory computer-readable storage medium, storing computer programs, when the computer programs are executed by a processor, the computer programs cause the processor to perform operations comprising:

obtaining, by the browser, a bit rate of a video to be played;

determining, by the browser, an available buffer duration based on an available memory size of a buffer and the bit rate;

initializing, by the browser, a player based on the available buffer duration;

buffering and playing the video using the player; and wherein the operations further comprise:

determining the available buffer duration based on a formula: $TO=(Y/X\times 8)/P$, wherein TO represents the available buffer duration, Y represents the available memory size of the buffer, X represents the bit rate, and P represents a predetermined video float ratio.

6. The non-transitory computer-readable storage medium of claim 5, the operations further comprising:

determining whether a default maximum buffer duration TN is greater than the available buffer duration TO;

initializing the player based on the available buffer duration as a buffer length of the browser in response to determining that the default maximum buffer duration TN is greater than the available buffer duration TO; and initializing the player based on the default maximum buffer duration as the buffer length of the browser in response to determining that the default maximum buffer duration TN is not greater than the available buffer duration TO.

7. The non-transitory computer-readable storage medium of claim 5, the operations further comprising:

buffering in real time during a playback, wherein content of the video in the buffer comprises a part of the video prior to a current playing position and a part of the video after the current playing position.

8. The non-transitory computer-readable storage medium of claim 7, wherein a ratio between the part of the video prior to the current playing position and the part of the video after the current playing position is 1:2.

9. A device of intelligently buffering a Web video based on a browser, comprising:

a processor and a memory, wherein the memory stores computer programs, when the computer programs are executed by the processor, the computer programs cause the processor to perform operations comprising:

obtaining, by the browser, a bit rate of a video to be played;

determining, by the browser, an available buffer duration based on an available memory size of a buffer and the bit rate;

initializing, by the browser, a player based on the available buffer duration;

buffering and playing the video using the player; and wherein the operations further comprise:

determining the available buffer duration TO based on a formula: $TO=(Y/X\times 8)/P$, wherein TO represents the available buffer duration, Y represents the available memory size of the buffer, X represents the bit rate, and P represents a predetermined video float ratio.

10. The device of claim 9, the operations further comprising:

determining whether a default maximum buffer duration TN is greater than the available buffer duration TO;

initializing the player based on the available buffer duration as a buffer length of the browser in response to determining that the default maximum buffer duration TN is greater than the available buffer duration TO; and initializing the player based on the default maximum buffer duration as the buffer length of the browser in response to determining that the default maximum buffer duration TN is not greater than the available buffer duration TO.

11. The device of claim 9, the operations further comprising:

buffering in real time during a playback, wherein content of the video in the buffer comprises a part of the video prior to a current playing position and a part of the video after the current playing position.

12. The device of claim 11, wherein a ratio between the part of the video prior to the current playing position and the part of the video after the current playing position is 1:2.

* * * * *